United States Patent [19]

Carlin

[11] Patent Number: 4,912,722
[45] Date of Patent: Mar. 27, 1990

[54] SELF-SYNCHRONOUS SPREAD SPECTRUM TRANSMITTER/RECEIVER

[75] Inventor: James W. Carlin, Holmdel, N.J.

[73] Assignee: AT&T Bell Laboratories, Murray Hill, N.J.

[21] Appl. No.: 246,724

[22] Filed: Sep. 20, 1988

[51] Int. Cl.$^4$ .............................................. H04K 1/00
[52] U.S. Cl. ........................................... 375/1; 380/21
[58] Field of Search ....................... 375/1; 380/21, 34

[56] References Cited

U.S. PATENT DOCUMENTS

| | | | |
|---|---|---|---|
| 3,605,018 | 9/1971 | Coviello | 325/65 |
| 4,048,563 | 7/1977 | Osborne | 325/58 |
| 4,112,372 | 9/1978 | Holmes et al. | 325/321 |
| 4,264,628 | 8/1979 | Ward et al. | 179/15 BA |
| 4,285,060 | 8/1981 | Cobb et al. | 375/1 |
| 4,335,463 | 6/1982 | Foucard | 375/1 |
| 4,351,064 | 8/1982 | Ewanus | 455/29 |
| 4,360,810 | 11/1982 | Landt | 343/6.5 R |
| 4,423,517 | 12/1983 | Danno | 375/1 |
| 4,460,992 | 7/1984 | Gutleber | 370/19 |
| 4,653,069 | 3/1987 | Roeder | 380/31 |
| 4,703,474 | 10/1987 | Foschini et al. | 375/1 |
| 4,805,216 | 2/1989 | Gruenberg | 380/21 |
| 4,829,540 | 5/1989 | Waggener, Sr. et al. | 375/1 |

FOREIGN PATENT DOCUMENTS 2125654   3/1984   United Kingdom .

OTHER PUBLICATIONS

Laber et al., *IEEE Trans. on Aerospace & Electrical Sys.*, vol. AES-16, No. 4, Jul. 1980, pp. 440-445.

Hasegawa et al., *NEC Res. & Develop.*, No. 17, Oct. 1983, pp. 48-57.

Pfeiffer et al., *Proc. SPIE*, vol. 434, Aug. 25, 1983, San Diego, Calif., pp. 20-22.

Spracklen et al., *8th FOC/LAN '84*, Las Vegas, Nev., Sep. 17-21, 1984, pp. 70-74.

*Primary Examiner*—Salvatore Cangialosi
*Attorney, Agent, or Firm*—Erwin W. Pfeifle

[57] ABSTRACT

The present invention relates to a self-synchronous spread spectrum transmitter and an associated remote spread spectrum receiver which communicate with each other by the transmission of both (1) a spread spectrum Pseudo Noise Code (PNC) sequence signal, and (2) a combined PNC sequence plus the data information (PNC+data) signal. The two signals can be transmitted concurrently using either different frequency bands or on a quadrature carrier; or the two signals can be transmitted with a time offset between signals. At the receiver the PNC and the PN+data signals are separately recovered for the case of the concurrent transmission techniques, and directly mixed to despread the received signal and recover the data signal at baseband. For the time offset technique, the delay provided in one of the time offset signals is again introduced to the previously delayed signal, and the delayed and undelayed signal portions of the received combined signal are directly mixed and then low pass filtered to recover the data signal. Such techniques eliminate the necessity for providing PNC acquisition and tracking circuits in associated spread spectrum transmitter and receiver combinations.

11 Claims, 4 Drawing Sheets

SELF-SYNCHRONOUS SPREAD SPECTRUM TRANSMITTER/RECEIVER

TECHNICAL FIELD

The present invention relates to a technique for realizing a self-synchronous spread spectrum transmitter/receiver which does not need pseudo-noise code acquisition and tracking circuits.

DESCRIPTION OF THE PRIOR ART

Spread spectrum is a signal coding and transmission technique wherein a sequence of different electromagnetic or electrooptic frequencies are used in a pseudo-random sequence to transmit a given information signal. With such technique the bandwidth is made deliberately larger than the information signal which is desired to be transmitted. The spread spectrum technique has grown in interest in the recent years for use in various radio and lightwave systems and networks to provide multiple access to the same frequency band with virtually no interference, and for purpose of secure communications. With the spread spectrum transmission technique, however, it is imperative that the transmission and reception functions are achieved by means of frequency modulation of the transmitter and receiver in precise synchronism in order to recover the information. In commercial satellite systems, the use of spread spectrum is also of interest since such technique permits the use of smaller antennas than needed with standard radio transmissions because a substantial reduction in the radiated power flux density can be achieved with a comparable predetermined level of recovered intelligence in the transmitted signal using the spread spectrum technique.

A typical spread spectrum communication system is disclosed in U.S. Pat. No. 4,351,064 issued to W. Ewanus on Sept. 21, 1982, where the spectrum is spread for transmission by superimposing a pseudo-noise code modulation on the intelligence modulation of a carrier. On reception, the spectrum is despread by auto-correlation of the pseudo-noise code. A tracking reference oscillator signal, which is impressed on the auto-correlated carrier at the receiver, is a periodic phase modulation which is passed by the receiver network to produce an error signal for maintaining the pseudo-noise encoder of the receiver in synchronism with the received code via tracking loop.

Various techniques have been used to use provide synchronization for a spread spectrum communication receiver. In this regard see, for example, U.S. Pat. No. 4,423,517, issued to T. Danno et al. of Dec. 27, 1983, where a synchronization circuit in the receiver generates a receiving code sequence which is identical to the input code sequence and then varies the timing of the receiving code sequence using a correlator until the two code sequences are correlated. Another code sequence synchronization system for a spread spectrum receiver is disclosed in U.S. Pat. No. 4,653,069 issued to A. W. Roeder on Mar. 24, 1987, where the receiver synchronizes to the transmitted signal by performing a continuous sequence of correlations until a correlation output exceeding a predetermined threshold is achieved, after which a plurality of correlations are performed during a sampling period interval when high subsequent correlation output signals are likely to occur. A technique for providing a spread spectrum code tracking loop is disclosed in, for example, FIG. 5 of U.S. Pat. No. 4,285,060 issued to R. F. Cobb et al. on Aug. 18, 1981. There, the arrangement includes signal power measuring circuitry, the output of which has a polarity which is effectively independent of the gains of the separate channels, whereby gain variations for the separate channels, which would cause mistiming of the lcoally generated pseudo-noise codes in a conventional delay lock loop configuration, do not influence the code correlation process.

The problem remaining in the prior art is to provide a technique for spread spectrum transmissions which could eliminate the need for the expensive pseudo-noise code acquisition and tracking systems and thereby provide a low-cost, compact design spread spectrum transmitter/receiver. Present pseudo noise code acquisition systems also have long acquisition times and a further problem would be to provide a technique which can be useful in conjunction with existing code acquisition systems to provide a composite system with low acquisition times.

SUMMARY OF THE INVENTION

The foregoing problems in the prior art have been solved in accordance with the present invention which relates to a technique for eliminating the necessity for providing pseudo-noise (PN) code acquisition and tracking circuits in a spread spectrum transmitter/receiver, or for providing a composite system that operates with an existing code acquisition system to provide low acquisition times. More particularly, the present transmitter transmits both (a) the PN spreading code and (b) the combined PN spreading code plus the data information signal, where the PN and PN+data signals can be sent either (1) on different frequencies, (2) on a quadrature carrier, or (3) with a time offset. At the receiver the received PN spreading code and the PN+data signals are separately recovered and used to decode the PN+data signal to obtain the despread data information signal.

Other and further aspects of the present invention will become apparent during the course of the following description and by reference to the accompanying drawings.

DETAILED DESCRIPTION

The present invention is described hereinafter with reference to a satellite communication system. It should be understood, however, that the concept of the present invention can also be applied to terrestrial radio or lightwave communication systems. A spread spectrum system in a commercial satellite system can reduce the satellite system's susceptibility to, and generation of, both adjacent satellite interference and terresterial interference, and allows the use of small and less costly earth stations. Since earth station cost is an important parameter in satellite systems, one way to reduce the cost of the earth station design for a spread spectrum system is to simplify, or eliminate, the need for a Pseudo Noise (PN) code acquisition and tracking circuit. In accordance with the present invention, this is accomplished by transmitting both a first signal comprising just the PN spreading code (PNC), and a second signal comprising the PNC plus the information data signal (PNC+data corresponding to the spread spectrum data signal) through the satellite to the remote destined receiver in the manner shown in FIG. 1.

Figure 1:
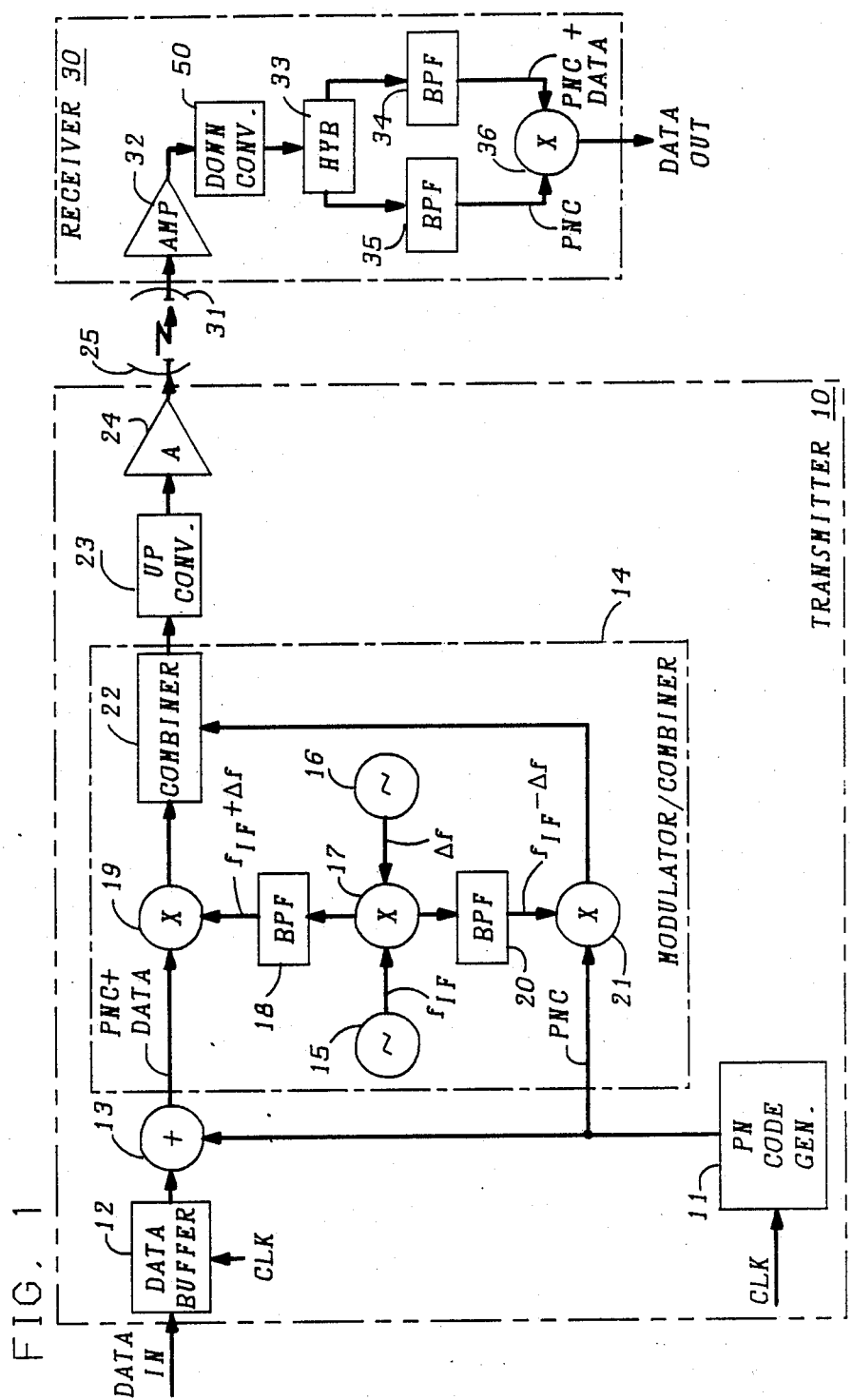
FIG. 1 is a block diagram of an exemplary spread spectrum transmitter and receiver that communicate with each other via a PNC and a PNC+data spread spectrum signal which is offset in frequency by 2Δf.

FIG. 1 is a block diagram of a self-synchronous transmitter 10 and receiver 30 for concurrently transmitting and receiving, respectively, the PNC and the PNC+data signals in separate frequency bands in accordance with one aspect of the present invention. The phrase homodyne-type transmitter/receiver is used to define the transmission of the spread spectrum PNC and PNC+data signals which are despread at the receiver by a direct mixing of the two signals to baseband. In transmitter 10, the PNC signal is generated in a generator 11. The generated PNC signal is then combined with an input data signal, which may be received directly from a remote user or from storage in a data buffer 12, in an adder 13 to produce the PNC+data signal at the output of binary adder 13. The PNC signal generated by generator 11 and the PNC+data signal from adder 12 are provided as separate inputs to a modulator/combiner 14. In modulator/combiner 14, a first oscillator 15 generates an output frequency designated $f_{IF}$ while a second oscillator 16 generates an output frequency designated $\Delta f$ which is small compared to $f_{IF}$.

Figure 2:
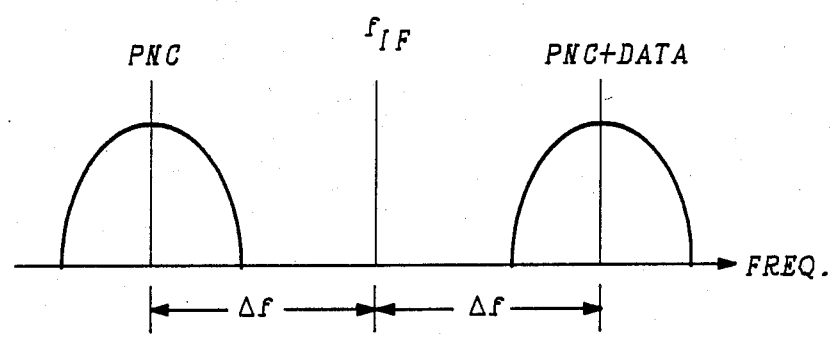
FIG. 2 is a frequency spectrum of an exemplary resultant signal from the modulator/combiner in the transmitter of the arrangement of FIG. 1.

The output frequencies from oscillators 15 and 16 are mixed in mixer 17 to produce the products including the two sidebands of $f_{IF}$. A first bandpass filter 18 is tuned to only pass the upper sideband frequency of $f_{IF}+\Delta f$ from the output of mixer 17, which acts as a carrier that is modulated in mixer 19 with the PNC+data signal generated by mixer 13 to produce the PNC+data signal in a first frequency band. Similarly, a second bandpass filter 20 is tuned to only pass the lower sideband frequency of $f_{IF}-\Delta f$ from the output of mixer 17, which frequency acts as a carrier that is modulated in mixer 21 with the PNC signal generated by PNC generator 11 to produce the PNC signal in a second frequency band. The modulated PNC+data signal from mixer 19 and the modulated PNC signal from mixer 21 are combined in combiner 22 to produce an output signal as depicted in FIG. 2. The output signal from combiner shown in FIG. 2 is then upconverted in upconverter 23 to the proper frequency band for transmission, amplified in amplifier 24 to a proper level for transmission, and trasmitted via antenna 25 either directly or via a satellite (not shown) to receiver 30.

At receiver 30, an antenna 31 receives the electromagnetic signal transmission from transmitter 10 and delivers it to an amplifier 32 where the signal is amplified to a desired level. The output signal from amplifier 32 is then provided to the input of a hybrid circuit 33 where the received signal is divided into two parts, with each part of the amplified signal propagating along a separate path. A bandpass filter 34 which is tuned to only pass the frequency band of the received PNC+data signal and block all other is disposed in a first one of the output paths from hybrid 33, while a second bandpass filter 35 which is tuned to pass only the frequency band of the PNC signal and block all others is disposed in the second output path from hybrid 33. The PNC+data and PNC output signals from bandpass filters 34 and 35, respectively, are mixed in a mixer 36, which can take the form of a double balanced mixer, to despread and recover the data signal at its output. This despread data signal is recovered at the IF frequency of $2\Delta f$ and can then be demodulated accordingly with any suitable technique.

Figure 4:
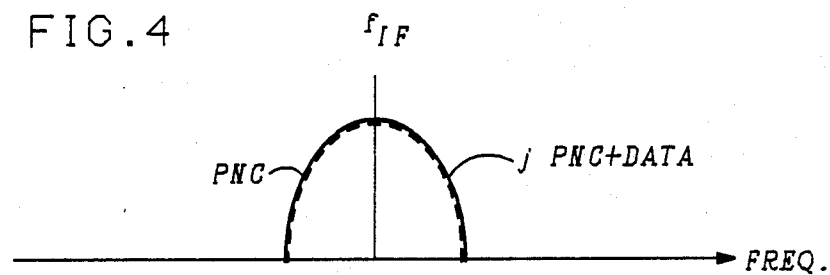
FIG. 4 is a frequency spectrum of an exemplary resultant signal from the modulator/combiner in the transmitter of the arrangement of FIG. 3.
Figure 6:
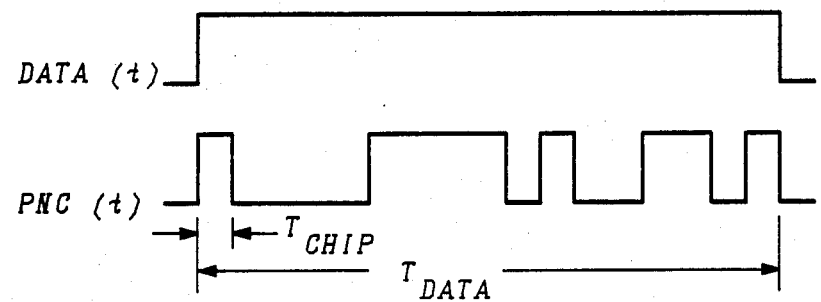
FIG. 6 illustrates an exemplary data and a PNC signal in the time domain for describing exemplary delays necessary in the arrangement of FIG. 5.
Figure 3:
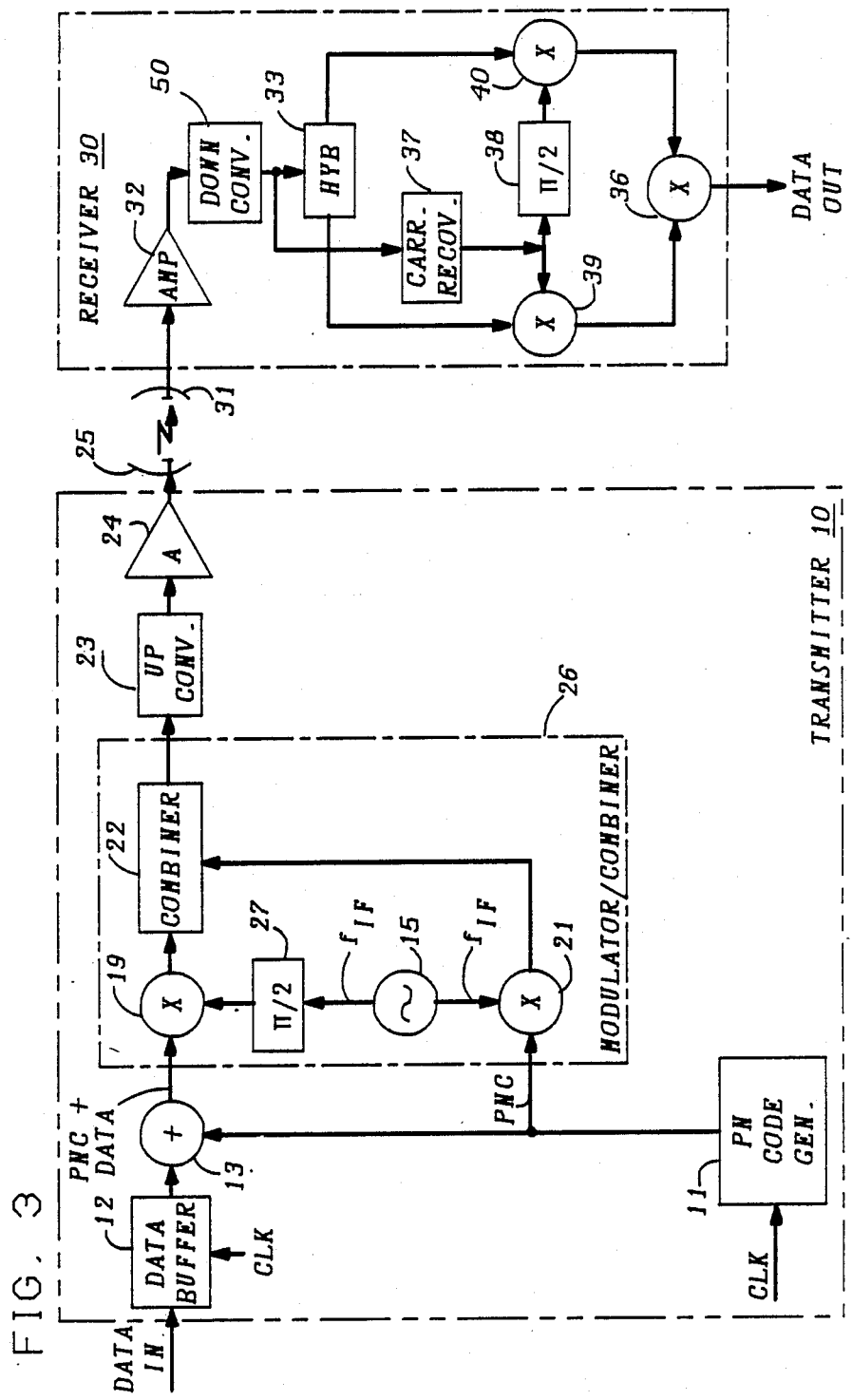
FIG. 3 is a block diagram of an exemplary spread spectrum transmitter and receiver that communicate with each other via a PNC and a PNC+data spread spectrum signal on a quadrature carrier.

Another aspect of the present invention is to transmit the PNC and the PNC+data signals on a quadrature carrier. An arrangement for accomplishing this aspect is shown in FIG. 3, where elements in transmitter 10 and receiver 30 having corresponding numbers to the elements in FIG. 1 function as described for those elements in FIG. 1. Modulator/combiner 26 in transmitter 10 of FIG. 3 includes an oscillator 15 which provides the carrier $f_{IF}$ as found with oscillator 15 of FIG. 1. This carrier is used to directly modulate the PNC signal in mixer 21 to provide the in-phase PNC output signal to combiner 22 while the carrier is shifted in phase by 90 degrees in phase shifter 27 and used in mixer 19 to provide a quadrature PNC+data output signal to combiner 22. For this aspect, mixers 19 and 21 are preferably double balanced mixers. The output signal from combiner 22 is depicted in FIG. 4 where the PNC and the PNC+data signals lie in the same frequency band but are transmitted on quadrature carriers at a frequency $f_{IF}$. The output signal from combiner 22 is transmitted to receiver 30 via upconverter 23, amplifier 24 and antenna 25.

In receiver 30, the received signal passes through amplifier 32 and downconverter 50, hybrid circuit 33 again divides the amplified received downconverted signal into two parts for propagation along separate paths. A carrier recovery circuit 37 recovers the carrier $f_{IF}$ from the received signal which is used directly in mixer 39 to recover the in-phase PNC signal from a first part of the received signal at the output of mixer 39. The recovered carrier is shifted in phase by 90 degrees in shifter 38 and the quadrature carrier is mixed with the second part of the received signal in mixer 40 to provide an in-phase PNC+data signal at the output of mixer 40. The two in-phase signals are mixed in mixer 36 to obtain the despread recovered data signal at the output of receiver 30 for further demodulation by any suitable technique. It is to be understood that any other suitable technique can be used to recover the data signal in receiver 30.

Figure 5:
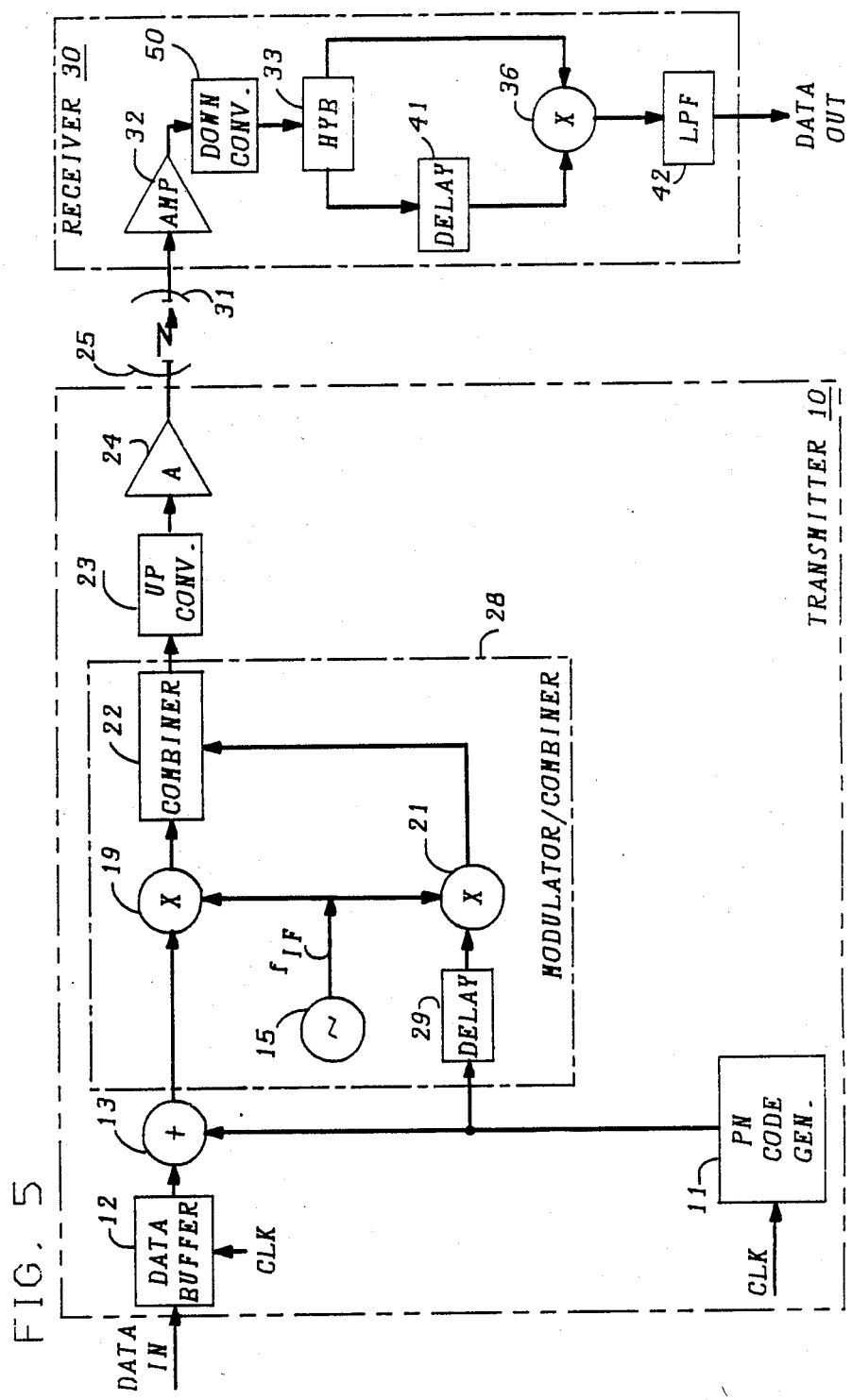
FIG. 5 is a block diagram of an exemplary spread spectrum transmitter and receiver that communicate with each other via a PNC and a PNC+data spread spectruum signal with a time offset.

A third aspect of the present invention is to transmit the PNC and PNC+data signals with a time offset. A transmitter 10 and reciver 30 for providing such time offset feature is shown in FIG. 5 where the PNC generated by generator 11 is delayed in time by a predetermined amount before being mixed in mixer 21 with the carrier $f_{IF}$ generated by oscillator 15. Concurrent there-with, an undelayed PNC+data signal from mixer 13 is mixed in mixer 19 with the carrier $f_{IF}$. It is preferable that mixers 19 and 21 comprise double balanced mixers for this aspect of the invention. The resultant delayed and mixed PNC signal from mixer 21, and the undelayed and mixed PNC+data signal from mixer 19 are combined in combiner 22 and transmitted via upconverter 23, amplifier 24 and antenna 25 to receiver 30. At receiver 30, the received spread spectrum signal is amplified in amplifier 32 and divided into two parts for propagation along two separate paths. A predetermined delay, corresponding to the delay provided in delay circuit 29 of transmitter 10, is produced in one of the parts of the received signal by delay circuit 41. This delayed part and the undelayed part of the received signal are mixed in a double balanced mixer 36 and the resultant output signal is transmitted through a low-pass filter 42 to produce the despread data signal. A downconverter 50 can be placed between amplifier 32 and hybrid 33 if desired.

The predetermined amount of delay provided in delay circuits 29 and 41 can be determined as follows. For a spread spectrum system, the chip rate is much greater than the data rate, and the individual PNC sequences are orthogonal or uncorrelated when offset by any integer multiple K of $T_{Chip}$ if the multiple, K, is not equal to $T_{Data}/T_{Chip} = N$ or an integer multiple of N. This suggests that the delay in circuits 29 and 41 should be equal to, for example, $K\ T_{Chip}$. In transmitter 10, the output of mixer 19 can be designated as $A(t)$ and the output from mixer 21 can be designated as $B(t - KT_{Chip})$ which two signals are added in combiner 22 and transmitted to receiver 30. At receiver 30, the undelayed received signal at both the outputs of hybrid 33 and at one of the inputs to mixer 36 is designated as $$A(t) + B(t - KT_{Chip}). \tag{1}$$

The delayed signal at the other input of mixer 36 can be designated by $$A(t - KT_{Chip}) + B(t - 2KT_{Chip}). \tag{2}$$

When these two signals are mixed in mixer 36 an output signal results which can be designated by:

$$A(t)A(t-KT_{Chip}) + A(t-KT_{Chip})B(t-KT_{Chip}) + A(t)B(t-2KT_{Chip}) + B(t-KT_{Chip})B(t-2KT_{Chip}). \tag{3}$$

Therefore, at the output of double balanced mixer 36, three high frequency components or spread sequences are obtained and the second term, which when despread, is the desired data signal. This collapsing of the second term can be shown by the following:

$$\begin{aligned} A(t - KT)B(t - KT) &= e^{j(\omega_{IF}t + PN(t-KT) + D(t-KT))} \\ &\quad * e^{-j(\omega_{IF}t + PN(t-KT))} \\ &= e^{jD(t-KT)} \end{aligned} \tag{4}$$

which is the desired data output.

The low pass filter 42 is tuned to pass the second term of equation (3) since this is the desired despread data signal.

It is to be understood that the transmission of a PNC and PNC+data signal with either a frequency or time offset, or via a quadrature carrier can also be accomplished in a lightwave or infrared communication system by, for example, using the output of modulator/combiner 14, 26 or 18 to intensity modulate a lasing means.

What is claimed is:

1. A spread spectrum transmitter comprising:
    a generator for generating a pseudo-noise code sequence;
    combining means for combining the pseudo-noise code sequence from the generator and a data information signal provided as an input to the transmitter to generate a spread spectrum data information output signal;
    a modulator/combiner for separately modulating each of (1) the spread spectrum data information output signal from the combining means and (2) the pseudo-noise code sequence from the generator to place both modulated signals into a predetermined synchronous multiplexing relationship to each other so that each signal is capable of being simultaneously received, separated and multiplied together to provide self-synchronous instantaneous despreading at a remote receiver, and combining the two modulated signals into a multiplexed modulator/combiner output signal; and
    means for transmitting the multiplexed output signal from the modulator/combiner in an appropriate frequency band to a remote receiver.

2. A spread spectrum transmitter according to claim 1 wherein the predetermined multiplexing relationship is a frequency division multiplexed relationship and the modulator/combiner comprises:
    modulating means for modulating a first predetermined carrier with the spread spectrum data information output signal from the combining means to generate a modulated spread spectrum data information output signal disposed in a first frequency band, and for separately modulating a second predetermined carrier with the pseudo-noise code sequence from the generator to generate a modulated pseudo-noise code sequence output signal in a second frequency band which does not overlap the first frequency band; and
    a combiner for combining the modulated spread spectrum data information output signal and the modulated pseudo-noise code sequence output signal to generate the modulator/combiner frequency division multiplexed output signal.

3. A spread spectrum transmitter according to claim 2 wherein the modulating means of the modulator/combiner comprises:
    generating means for generating both a first predetermined frequency output signal, and a second predetermined frequency output signal which includes a different frequency band from the first frequency output signal;
    means for mixing the first and second predetermined frequency output signals from the generating means to produce (1) a first sideband signal corresponding to the first predetermined carrier, and (2) a second sideband signal corresponding to the second predetermined carrier signal;
    mixing means for (1) mixing the first predetermined carrier with the spread spectrum data information output signal from the combining means to generate the modulated spread spectrum data information output signal, and (2) mixing the second predetermined carrier with the pseudo-noise code sequence from the generator to generate the modulated pseudo-noise code sequence output signal.

4. A spread spectrum transmitter according to claim 1 wherein the predetermined multiplexing relationship is a quadrature signal relationship, the modulator/combiner comprising:
   carrier generating means for generating from a predetermined carrier a separate in-phase and quadrature carrier component;
   mixing means for (1) mixing either one of the spread spctrum data information signal and the pseudo-noise code sequence with the in-phase carrier component to provide an in-phase output signal, and (2) mixing the other one of the spread spectrum data signal and the pseudo-noise code sequence with the quadrature carrier component to provide a quadrature output signal; and
   a combiner for combining the in-phase and quadrature output signals from the mixing means to generate the multiplexed modulator/combiner output signal.

5. A spread spectrum transmitter according to claim 1 wherein the predetermined multiplexing relationship is a time division multiplexed relationship, the modulator/combiner comprising:
   delay means for delaying only one of the spread spectrum data information output signal from the combining means and the pseudo-noise code sequence from the generator by a predetermined amount of time;
   a generator for generating a predetermining carrier;
   means for separately modulating the spread spectrum data information signal and the pseudo-noise code sequence signal, subsequent to a delay introduced to one of the signals by the delay means, to generate a modulated spread spectrum data information output signal and a modulated pseudo-noise code sequence output signal, respectively; and
   a combiner for combining the modulated spread spectrum data information output signal and the modulated pseudo-noise code sequence output signal to generate the modulator/modulator output signal.

6. A spread spectrum transmitter according to claim 5 wherein
   the predetermined amount of delay time provided by the delay means is equal to $KT_{Chip}$, where K is an integer and $T_{Chip}$ is the chip rate associated with the pseudo-noise code sequence.

7. A method of transmitting signals from a transmitter in a spread spectrum communication system, the method comprising the steps of:
   (a) generating a predetermined pseudo-noise code sequence signal;
   (b) combining the pseudo-noise code sequence signal with a data information input signal received by the transmitter to generate a spread spectrum data information output signal;
   (c) separately modulating each of (1) the spread spectrum data information output signal generated in step (b), and (2) the pseudo-noise code sequence signal generated in step (a) to generate a modulated spread spectrum data information output signal and a modulated pseudo-noise code sequence output signal, respectively, which signals are disposed in a predetermined synchronous multiplexing relationship with each other;
   (d) combining the modulated spread spectrum data information signal and the modulated pseudo-noise code sequence signal from step (c) to generate a multiplexed output transmission signal wherein each modulated signal is capable of being simultaneous received at a remote receiver to provide self-synchronous instantaneous despreading at the remote receiver; and
   (e) transmitting the multiplexed output transmission signal from step (d) to the remote receiver in an appropriate frequency band.

8. The method according to claim 7 wherein in performing step (c), performing the steps of:
   (c1) modulating a first predetermined carrier with the spread spectrum data information signal to generate the modulated spread spectrum data information output signal disposed a first frequency band; and
   (c2) modulating a second predetermined carrier with the pseudo-noise code sequence to generate the modulated pseudo-noise code sequence output signal disposed in a second frequency band which is different from the first frequency band.

9. The method according to claim 7 wherein in performing step (c), performing the steps of:
   (c1) generating a first and a second sideband carrier signal of a predetermined carrier frequency;
   (c2) modulating the first sideband carrier signal with the spread spectrum data information signal to generate the modulated spread spectrum data information output signal: and
   (c3) modulating the second sideband carrier signal with the pseudo-noise code sequence to generate the modulated pseudo-noise code sequence output signal.

10. The method according to claim 7 wherein in performing step (c), performing the steps of:
    (c1) generating an in-phase and a quadrature component of a predetermined carrier signal;
    (c2) modulating one of the in-phase and quadrature components of the predetermined carrier signal with the spread spectrum data information signal to generate the modulated spread spectrum data information output signal; and
    (c3) modulating the other one of the in-phase and quadrature components of the predetermined carrier signal, not used in step (c2), with the pseudo-noise code sequence signal to generate the modulated pseudo-noise code sequence output signal.

11. The method according to claim 7 wherein in performing step (c), performing the steps of:
    (c1) delaying only one of the spread spectrum data information signal and the pseudo-noise code sequence by a predetermined amount of time; and
    (c2) separately modulating a predetermined carrier with each of (1) the spread spectrum data information signal and (2) the pseudo-noise code sequence signal, subsequent to any delay imposed in one of the signals in step (c1), to provide the modulated spread spectrum data information output signal and the modulated pseudo-noise code sequence output signal, respectively.

* * * * *